Patented May 13, 1930

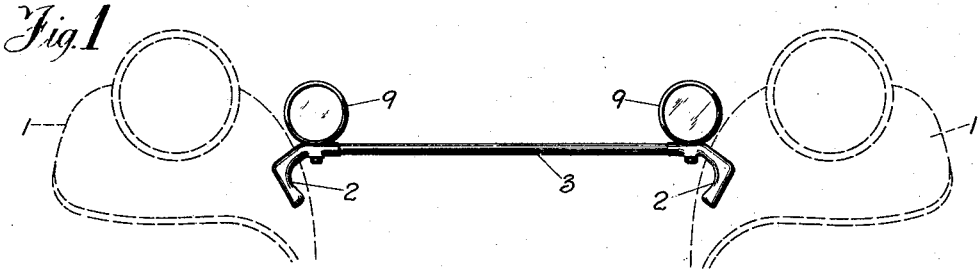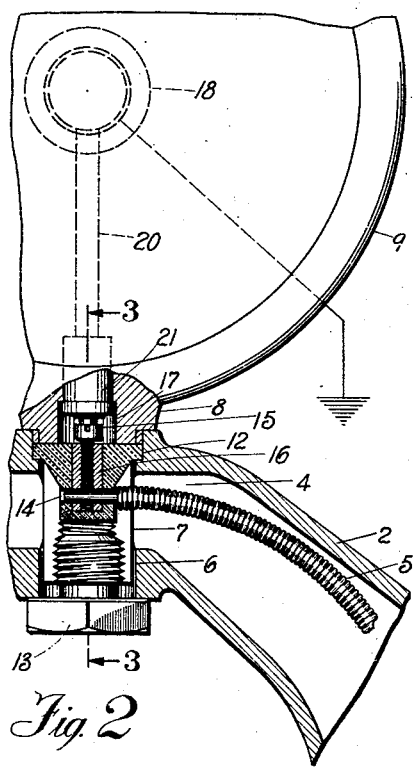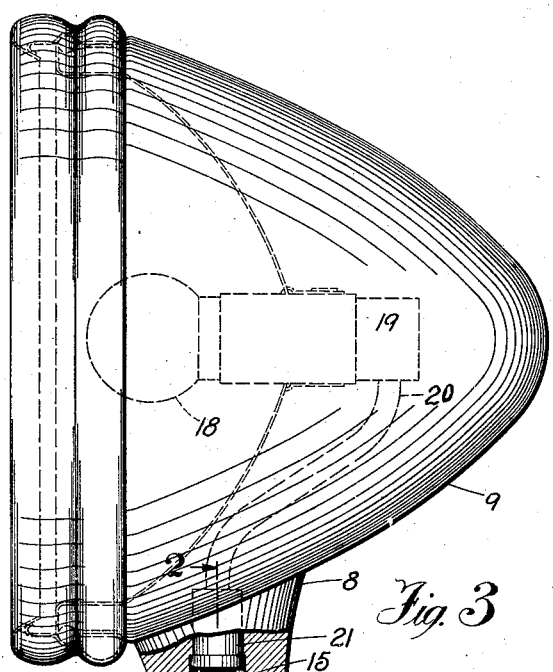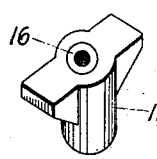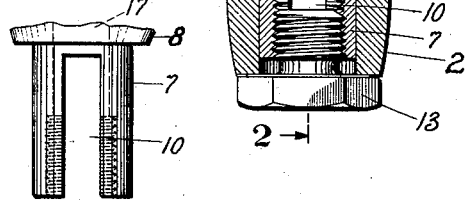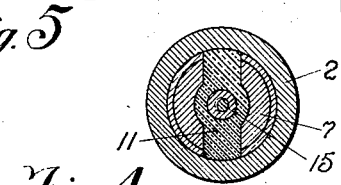

1,758,306

UNITED STATES PATENT OFFICE

KARL M. WISE, OF BUFFALO, NEW YORK, ASSIGNOR TO THE PIERCE-ARROW MOTOR CAR COMPANY, OF BUFFALO, NEW YORK, A CORPORATION OF NEW YORK

HEADLIGHT MOUNTING

Application filed May 23, 1929. Serial No. 365,330.

This invention relates to headlights and particularly to improvements in headlight mountings for motor vehicles.

One of the objects of the invention is to provide a bracket joint which is so constructed that a permanent and positive connection of the conductor wires is maintained whatever may be the position of the headlight relative to its support.

A further object is to provide a headlight including a coupling member which will permit the pivotal movement of the headlight on a supporting bracket, and also permit the removal of the headlight from the bracket without necessitating the direct manual disconnection of the conductor wires.

A further object is to provide a headlight mounting including a connection for the conductor wires whereby the same are concealed from view, the mounting being constructed to permit the removal of the headlight from its support without necessitating the direct manual disconnection of the conductor wires.

A still further object is provide a hollow bracket supported by a motor vehicle in which a conductor wire may be enclosed, a headlight pivotally mounted on the bracket, and a coupling which will permit the removal of the headlight from the bracket without necessitating the direct manual disconnection of the conductor wires.

The above and other objects relating to certain features of construction and combination of parts to be hereinafter described with reference to the accompanying drawing and then claimed, will be apparent from the detailed description to follow.

In the accompanying drawing which illustrates a suitable embodiment of the present invention, Figure 1 is an elevational view showing a pair of headlights supported on brackets secured to the fenders of a motor vehicle.

Figure 2 is a fragmentary sectional view taken on the line 2—2 of Figure 3, showing a portion of the headlight in elevation.

Figure 3 is a sectional view taken on the line 3—3 of Figure 2, showing the headlight in side elevation.

Figure 4 is a sectional view taken on the line 4—4 of Figure 3.

Figure 5 is a perspective view of the insulating member adapted to receive the free end of a conductor wire.

Figure 6 is a fragmentary elevational view of the headlight supporting member.

Referring to the accompanying drawing in which like numerals refer to like parts throughout the several views, I have shown for the purpose of illustration a pair of fenders 1 to each of which are secured the brackets 2 suitably tied together with the cross member 3. As the construction of the brackets 2 is identical except that the respective supporting bases are formed as a right and left hand member to be seated on the fenders 1, a further detailed description of only one of the brackets will be given. The bracket 2 is preferably hollow to provide a chamber 4 in which the conductor wire 5 may be enclosed so that it will be concealed from view and protected against injury due to outside forces.

A vertical opening 6 is formed in the bracket 2 and is adapted to receive the end portion 7 of a supporting member 8 secured to the headlight 9. The end 7 of the member 8 is preferably slotted at 10 to receive the generally T-shaped insulating member 11 therein, the head of the member 11 being seated in a recess 12 formed in the bracket 2 which is slightly larger than the opening 6 extending therethrough. The headlight 9 is permitted to pivot on the bracket 2 and is locked in adjusted position by means of the screw 13 threaded into the end of the part 7, the head of the screw 13 locking against the lower face of the bracket 2 as is clearly shown in Figures 2 and 3. The insulating member 11 is provided with a transverse opening 14 therein in which the free end of the conductor wire 5 may be inserted, the same being locked in position by means of the screw 15 threaded into the bushing 16 as shown in Figure 2. The head of the screw 15 preferably extends above the face of the insulating member 11 and is adapted to be received in the chamber 17 formed in the member 8 for a purpose to be hereinafter described.

The headlight 9 is provided with a lamp 18 having a socket 19 from which extends a conductor wire 20 having a terminal 21 received in the chamber 17. When the headlight is assembled on the bracket 2 the terminal 21 contacts with the screw 15 so that the connection for the conductor wires will be complete. The conductor wire 5 is preferably connected with a suitable source of electrical energy such as a storage battery (not shown) and having a switch (not shown) in the line, and the headlight 9 is preferably grounded on the frame or other suitable part of the vehicle so that the electric circuit will be complete. As the wiring of the headlight in this regard forms no part of my invention, and as it is of conventional construction and is well known to those skilled in the art, a more elaborate showing and further description is believed to be unnecessary.

From the description of the parts heretofore given the construction should be readily understood and the method of assembling the headlight on the support will be apparent. The insulating member 11 is seated in the recess 12 formed in the bracket 2 and the conductor wire 5 is secured in the insulating member 11 by means of the screw 15. The headlight 9 is then mounted on the bracket 2 with the slotted portion 7 of the member 8 extending over the insulating member 11 and the headlight is locked in position by means of the screw 13. When in this position the terminal 21 will be in contact with the screw 15 whereby a direct electrical connection will be made through the conductor wire 5, screw 15, terminal 21 and conductor wire 20 to the socket 19 of the lamp 18. When it is desired to disconnect the headlight and remove the same from its support it is only necessary to unscrew the screw 13 from the member 7 after which the headlight 9 can be moved vertically out of the opening 6 formed in the bracket 2 whereby the connection between the screw 15 and terminal 21 will be broken. In removing the headlight from its support the conductor wire 5 and the insulating member 11 will in no way be disturbed and the headlight can be removed from the bracket without necessitating the direct manual disconnection of the conductor wires.

While others have previously provided a mounting for a headlight so that the headlight could be pivotally mounted on its support, so far as I am aware no one has previously provided a pivotal mounting for a headlight which also permitted the mounting of the conductor wires in the manner herein shown so that the headlight could be disconnected or removed from its support without interfering with the wiring connections thus necessitating the direct manual disconnection of the wires.

Although the foregoing description is necessarily of a detailed character in order that the invention may be completely set forth, it is to be understood that the specific terminology is not intended to be restrictive or confining and that various re-arrangements of parts and modifications of structural details may be resorted to without departing from the scope or spirit of the invention as herein claimed.

What I claim is:

1. In a headlight mounting, the combination with a headlight and a support therefor, of a slotted member secured to said headlight extending into said support, an insulating member seated in said slot, a conductor wire enclosed in said support having a contact member secured in said insulating member, a conductor wire enclosed in said headlight having a terminal engaging said contact member, and means permitting the removal of said headlight from said support without necessitating the direct manual disconnection of said conductor wires.

2. In a headlight mounting, the combination with a headlight and a support therefor having an opening extending therethrough, of a slotted member secured to said headlight extending into said opening, an insulating member positioned in said slot having an extended portion seated on said support, a conductor wire enclosed in said support having a contact member secured in said insulating member, a conductor wire enclosed in said headlight having a terminal engaging said contact member, and means permitting the removal of said headlight from said support without disturbing the position of said insulating member and without necessitating the direct manual disconnection of said conductor wires.

3. In a headlight mounting, the combination with a headlight and a support therefor having an opening extending therethrough and having a shoulder formed therein adjacent to said opening, of a slotted member secured to said headlight extending into said opening, an insulating member positioned in said slot and having an extended portion seated on said shoulder, a conductor wire enclosed in said support having a contact member secured in said insulating member and projecting thereabove, a conductor wire enclosed in said headlight having a terminal engaging said contact member, and a screw threaded into said slotted member for securing said headlight on said support and permitting the removal of the same from said support without necessitating the direct manual disconnection of said conductor wires.

4. In a headlight mounting, the combination with a headlight and a support therefor having an opening extending therethrough, of a slotted member secured to said headlight extending into said opening, a T-shaped insulating member positioned in said slot and supported by said supporting member, a conductor wire enclosed in said support having a contact member secured in said insulating member, a conductor wire enclosed in said headlight having a terminal engaging said contact member, and a screw threaded into the end of said slotted member for securing said headlight on said support and permitting the removal of the same from said support without necessitating the direct manual disconnection of said conductor wires.

5. In a headlight mounting, the combination with a headlight and a support therefor having an opening extending therethrough, of a slotted member secured to said headlight extending into said opening, a T-shaped insulating member positioned in said slot and support by said support, a conductor wire enclosed in said support extending into said insulating member, a screw having its head extending above said insulating member threaded thereinto for securing said conductor wire therein, a conductor wire enclosed in said headlight having a terminal engaging said screw, and a second screw threaded into said slotted member for securing said headlight on said support and maintaining said terminal in contact with said first screw, the removal of said second screw from said slotted member permitting the removal of said headlight from said support without necessitating the direct manual disconnnection of said conductor wires.

Signed by me at Buffalo, New York, this 17th day of May, 1929.

KARL M. WISE.